United States Patent [19]
Buhler et al.

[11] Patent Number: 6,037,673
[45] Date of Patent: Mar. 14, 2000

[54] TOWING AND BRAKE CIRCUIT APPARATUS AND METHOD

[75] Inventors: Timothy D. Buhler, Moline; Dwight D. Lemke, Geneseo; Jeff G. Oligmueller, Colona; Leroy K. Pickett, Downers Grove, all of Ill.

[73] Assignee: Case Corporation, Racine, Wis.

[21] Appl. No.: 09/134,281

[22] Filed: Aug. 14, 1998

[51] Int. Cl.[7] ................................................ B60Q 1/52
[52] U.S. Cl. .......................... 307/9.1; 307/10.8; 315/80; 340/471
[58] Field of Search .................................. 307/9.1, 10.1, 307/10.7, 10.8; 303/123, DIG. 3, 3; 280/DIG. 14; 340/431, 471; 315/76, 77, 79, 80

[56] References Cited

U.S. PATENT DOCUMENTS

| | | |
|---|---|---|
| 2,234,607 | 1/1941 | Riedmaier . |
| 2,469,120 | 5/1949 | Kropp . |
| 3,981,544 | 9/1976 | Tomecek et al. ......................... 340/431 |
| 4,843,370 | 6/1989 | Milde, Jr. ................................. 307/10.8 |
| 4,856,850 | 8/1989 | Aichele et al. . |
| 5,000,519 | 3/1991 | Moore . |
| 5,370,449 | 12/1994 | Edelen et al. ................................ 303/3 |
| 5,675,190 | 10/1997 | Morita ..................................... 307/10.1 |

*Primary Examiner*—Richard T. Elms
*Attorney, Agent, or Firm*—Vincent J. Gnoffo; Brinks Hofer Gilson & Lione

[57] ABSTRACT

A towing and brake circuit includes a power source and a switch electrically connected between the power source and a park brake solenoid. A flasher module is electrically connected to the park brake solenoid. A unidirectional current controller may preferably be electrically connected between the park brake solenoid and the flasher module to electrically connect the park brake solenoid to the flasher module. An engine oil pressure switch is electrically connected between a power source and the park brake solenoid to flow current from the power source to the park brake solenoid when engine oil pressure is generated.

31 Claims, 1 Drawing Sheet

TOWING AND BRAKE CIRCUIT APPARATUS AND METHOD

FIELD OF THE INVENTION

This invention relates generally to an improved towing and brake circuit for agricultural machinery. In particular, the invention relates to a towing and brake circuit which electrically connects the hazard lights with the park brake to prevent inadvertently draining the battery. The circuit also prevents the park brake from engaging while the machine is running.

BACKGROUND OF THE INVENTION

Agricultural machines, such as harvesting combines and cotton pickers, typically have a hydraulically released and spring applied parking brake which is controlled electronically. In a normal operating mode, when the engine is running and the machine is moving, conventional brake circuits typically disengage the park brake by continuously energizing a park brake solenoid, which is controlled electronically by an ignition key switch located in the cab. When the key switch is in the on position, power is supplied to the park brake solenoid which keeps the park brake released. When the key switch is in the off position, the park brake solenoid is de-energized which sets the park brake.

In a towing situation, when the engine is inoperable, power must be supplied to the park brake solenoid to release the park brake. This is typically done by turning the ignition key switch to the on position which energizes the park brake solenoid. However, after the machine is towed, it is very common for an operator to believe that all of the functions of the machine are off since the engine is inoperable. As a result, the operator may forget to turn the key switch off. If this happens, the solenoid will continue to be energized and will eventually drain all of the power from the battery.

Another disadvantage of conventional brake circuits is that the key switch can be turned off while the machine is moving without turning off the engine, which is usually turned off by a push-pull cable from a throttle lever. As a result, if the machine is traveling at a high rate of speed on a road or highway and the key switch is inadvertently turned off, the park brake solenoid will be de-energized and the park brake will be engaged creating an undesirable situation.

Accordingly, it would be desirable to have a towing and brake circuit that overcomes the disadvantages described above, and to provide a simple and cost effective towing and brake circuit.

SUMMARY OF THE INVENTION

One aspect of the invention provides a towing and brake circuit including a power source and a switch electrically connected between the power source and a park brake solenoid. A flasher module is electrically connected to the park brake solenoid. The power source may preferably be a battery. The switch may be a three position switch including an off position, a hazards position and a towing position. A park brake switch may preferably be electrically connected between the switch and the park brake solenoid. An engine oil pressure switch may be electrically connected to the park brake switch. The park brake switch may be a two position switch including an off position and an on position. The park brake switch may include a left switch and a right switch. A diode may be electrically connected between the park brake switch and the park brake solenoid. A unidirectional current controller may be electrically connected between the flasher module and the park brake solenoid.

Another aspect of the invention provides a towing and brake circuit including a power source and a switch electrically connected to the power source. A park brake solenoid line is electrically connected to a park brake solenoid. A flasher module line is electrically connected to a flasher module and a unidirectional current controller is electrically connected between the park brake solenoid line and the flasher module line. The switch may be positioned in a hazards position to electrically connect the power source to the flasher module or a towing position to electrically connect the power source to the park brake solenoid line. The unidirectional current controller may preferably be a diode which is positioned to flow current from the park brake solenoid line to the flasher module line and to prevent current from flowing from the flasher module line to the park brake solenoid line. An engine oil pressure switch may be electrically connected to the power source, and the park brake solenoid may be electrically connected to the engine oil pressure switch.

Another aspect of the invention provides a towing and brake circuit including a power source and a pressure switch electrically connected to the power source. A park brake solenoid is electrically connected to the pressure switch. A flasher module may be electrically connected between the power source and the park brake solenoid. The power source may preferably be a battery, and the pressure switch may be an engine oil pressure switch. A park brake switch may be electrically connected between the switch and the park brake solenoid. An emergency brake switch may preferably be electrically connected between the park brake switch and the park brake solenoid. The emergency brake switch may include a left brake switch and a right brake switch. A diode may be electrically connected between the emergency brake switch and the park brake solenoid.

Another aspect of the invention provides a method for operating a towing and brake circuit. A power source and a switch electrically connected between the power source and a park brake solenoid is provided. A flasher module electrically connected to the park brake solenoid is also provided. The switch is positioned to electrically connect the power source with the park brake solenoid. Current is directed from the power source to the park brake solenoid and the flasher module. An engine without power may also be provided. Current may preferably flow from the power source while the engine is off. The power source may preferably be a battery, and current may be directed from the power source. The switch may preferably be a three position switch which includes a towing position. The switch may be positioned in the towing position. A park brake switch electrically connected between the switch and the park brake solenoid may also be provided. The park brake switch may be turned off to allow current to flow from the power source to the park brake solenoid. The park brake switch may be a two position switch. The park brake switch may be turned to an off position.

Another aspect of the invention provides a method for operating a towing and brake circuit. A power source and a switch electrically connected to the power source is provided. A park brake solenoid line electrically connected to a park brake solenoid and a flasher module line electrically connected to a flasher module are also provided. A unidirectional current controller electrically connected between the park brake solenoid line and the flasher module line is also provided. The switch is positioned in a towing position to electrically connect the power source to the park brake solenoid line. Current is directed from the power source to the park brake solenoid and to the flasher module. The unidirectional current controller may preferably be a diode. The diode may be positioned to direct current from the park brake solenoid line to the flasher module line and to prevent current from flowing from the flasher module line to the park brake solenoid line.

Another aspect of the invention provides a method for operating a towing and brake circuit. A power source and a pressure switch electrically connected to the power source is provided. A park brake solenoid electrically connected to the switch is also provided. The pressure switch is positioned to electrically connect the power source with the park brake solenoid. Current is directed from the power source to the park brake solenoid. The park brake solenoid is energized to release a park brake. A parking brake switch electrically connected between the switch and the park brake solenoid may also be provided. The park brake switch may be turned off to allow current to flow from the power source to the park brake solenoid. An emergency brake switch electrically connected between the park brake switch and the park brake solenoid may also be provided. The emergency park brake switch may be positioned to allow current to flow from the park brake switch to the park brake solenoid.

The invention provides the foregoing and other features, and the advantages of the invention will become further apparent from the following detailed description of the presently preferred embodiments, read in conjunction with the accompanying drawing. The detailed description and drawing are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
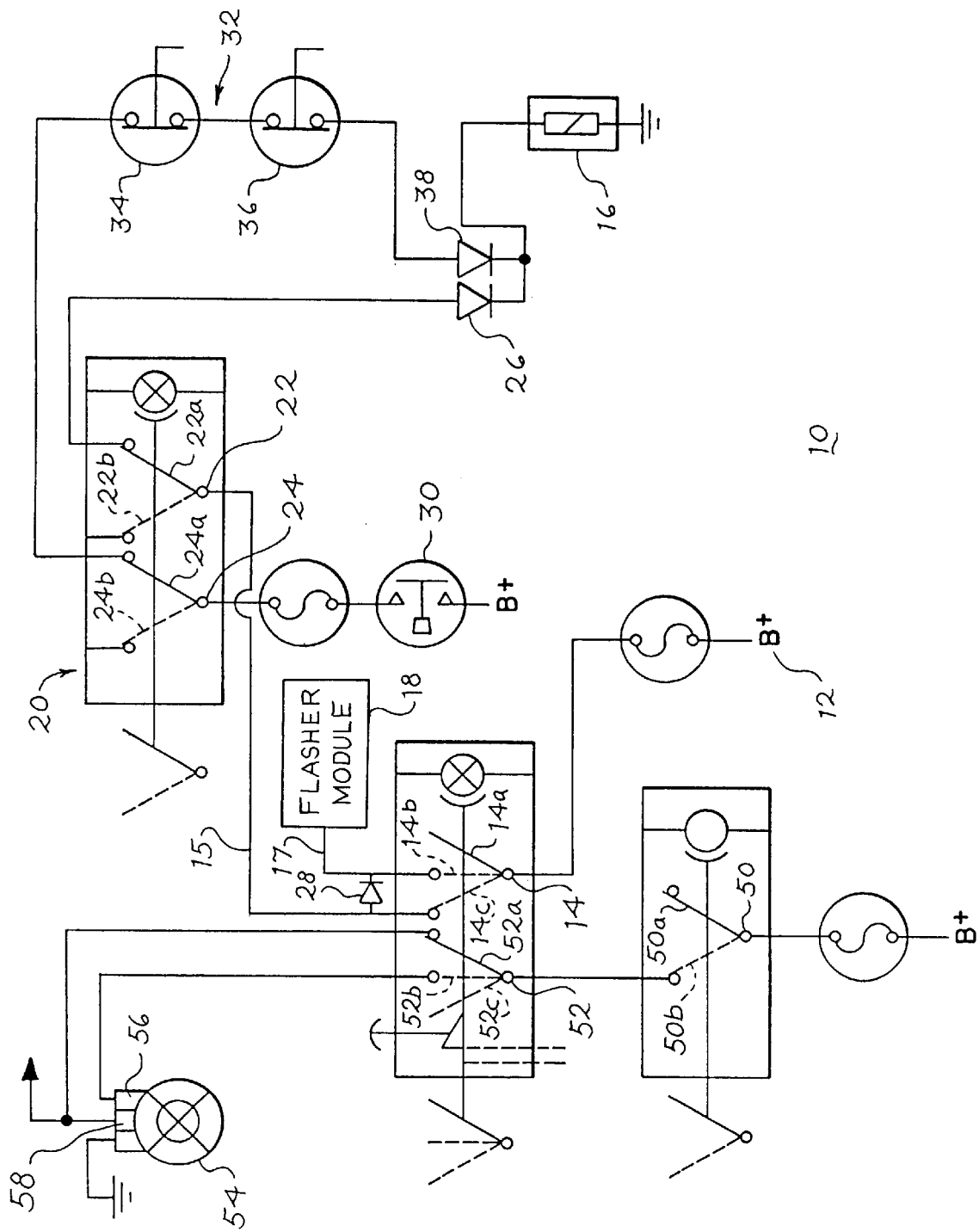
FIG. 1 is a schematic of a preferred embodiment of a towing and brake circuit which is made in accordance with the invention.

As shown in FIG. 1, a preferred embodiment of a towing and brake circuit 10 includes a power source 12 which is electrically connected to a switch 14. The switch 14 is electrically connected between the power source 12 and a park brake solenoid 16. A flasher module 18 is electrically connected to the park brake solenoid 16. In the embodiment shown, a park brake solenoid line 15 is electrically connected to the park brake solenoid 16 and a flasher module line 17 is connected to the flasher module 18.

The power source 12 may be any suitable source of power including, for example, a battery. The switch 14 may be any of the commercially available switches. In the embodiment shown, the switch 14 may preferably be a three position switch. As shown in FIG. 1, the three positions may include an off position 14a, a hazards position 14b, and a towing position 14c. The flasher module 18 may be any of the commercially available modules suitable for controlling hazard lights that are found on a wide variety of agricultural machinery and other types of vehicles.

The park brake solenoid 16 may be any of the commercially available solenoids. In operation, when the park brake solenoid 16 is energized, the park brake is released. When the park brake solenoid 16 is de-energized, the park brake is applied.

A park brake switch 20 may preferably be electrically connected between the switch 14 and the park brake solenoid 16. The park brake switch 20 may be any of the commercially available switches. The park brake switch 20 may include a first park brake switch 22 and a second park brake switch 24. In the embodiment shown, the first park brake switch 22 is electrically connected between the switch 14 and the park brake solenoid 16. In the embodiment shown, the first park brake switch 22 may preferably be a two position switch including an off position 22a and an on position 22b. Similarly, the second park brake switch 24 may preferably be a two position switch including an off position 24a and an on position 24b. As shown in FIG. 1, the first and second park brake switches 22, 24 operate in unison.

A diode 26 may be electrically connected between the park brake switch 20 and the park brake solenoid 16. In the embodiment shown, the diode 26 may be positioned to allow current to flow from the park brake switch 22 to the park brake solenoid 16 and to prevent current from flowing from the park brake solenoid 16 to the park brake switch 20.

As shown in FIG. 1, a unidirectional current controller 28 may be electrically connected between the park brake solenoid line 15 and the flasher module line 17. The unidirectional current controller 28 may be any electronic device that flows current in only one direction, such as, for example, a diode. As shown in FIG. 1, the unidirectional current controller 28 may preferably be positioned to flow current from park brake solenoid line 15 to the flasher module line 17 and to prevent the flow of current from the flasher module line 17 to the park brake solenoid line 15.

As shown in FIG. 1, a pressure switch 30 is electrically connected to the power source 12. The park brake solenoid 16 is electrically connected to the pressure switch 30. The pressure switch 30 may be any of the commercially available pressure switches. In the embodiment shown, the pressure switch 30 is an engine oil pressure switch. The park brake switch 20 may preferably be electrically connected between the pressure switch 30 and the park brake solenoid 16. In the embodiment shown, the second park brake switch 24 is electrically connected between the pressure switch 30 and the park brake solenoid 16.

An emergency brake switch 32 may be electrically connected between the park brake switch 20 and the park brake solenoid 16. The emergency brake switch 32 may be any of the commercially available switches. The emergency brake switch 32 may include a left brake switch 34 and a right brake switch 36.

A diode 38 may preferably be electrically connected between the emergency brake switch 22 and the park brake solenoid 16. The diode 38 may preferably be positioned to allow current to flow from the emergency brake switch 32 and the park brake solenoid 16 and to prevent current from flowing from the park brake solenoid 16 to the emergency brake switch 32.

When operating on a road or highway, the switch 14 may be placed in the second position 14b to electrically connect the power source 12 to the flasher module 18 which activates the hazard lights. In this position, the unidirectional current controller 28 prevents current from flowing from the flasher module 18 to the park brake solenoid 16. This ensures that the emergency brake switch 32 will not be bypassed when the machine is moving.

When there is no engine power and a towing operation is required, the operator turns the park brake switch 20 to the off position. This causes the first park brake switch 22 to be in the off position 22a. The switch 14 is placed in the towing position 14c to electrically connect the power source 12 to the park brake solenoid 16. When the switch 14 is in the towing position 14c, current flows from power source 12, through the switch 14, through the park brake solenoid line 15 and to the park brake solenoid 16 which energizes the park brake solenoid 16 and releases the park brake. In addition, current flows from the power source 12 to the flasher module 18 which activates the hazard lights. When the switch 14 is in the off position 14a, current is prevented from flowing to the park brake solenoid 16 and the flasher module 18. As a result, positioning the switch 14 in the off position 14a disconnects power from the hazard lights and the park brake, which allows the park brake to engage and prevent potential unintentional movement of the machine.

The advantage of this aspect of the invention is that the park brake solenoid 16 is electrically connected to the hazard lights. As a result, after the machine is towed and the operator turns the switch 14 to the off position 14a, the hazard lights will turn off and the park brake solenoid 16 will automatically become de-energized. Tying the park brake solenoid to the hazard lights prevents the inadvertent draining of battery power due to an operator forgetting to de-energize the park brake solenoid after a towing operation. Moreover, the circuit 10 and the associated hazard lights serve as a reminder that the park brake and transmission may have been disengaged for towing.

When the engine is running and the machine is moving, the emergency park brake switch 32 is closed to allow current to flow from the park brake switch 20 to the park brake solenoid 16. The engine oil pressure generated by the engine causes the engine oil pressure switch 30 to close which electrically connects the power source 12 with the park brake solenoid 16. When the engine oil pressure switch 30 is closed, current flows from the power source 12, through the pressure switch 30 and to the park brake solenoid 16 which energizes the park brake solenoid 16 and releases the park brake and maintains it in a disengaged or released position. When there is no engine oil pressure, such as when the engine is turned off, the engine oil pressure switch 30 is open which prevents current from flowing from the power source 12 to the park brake solenoid 16.

The advantage of this aspect of the invention is that power is supplied to the park brake solenoid 16 from an engine oil pressure switch 30. As a result, even if the ignition key switch is turned off while the machine is traveling at a high rate of speed on a road or highway, current will nonetheless flow from the power source 12 to the park brake solenoid 16 to maintain the park brake in the released position.

In the embodiment shown, a light switch 50 is operably connected to a light controlling switch 52. As shown in FIG. 1, the light controlling switch 52 and the switch 14 operate in unison. The light controlling switch is operably connected to the headlights 54 of the machine. The headlights 54 include a low beam 56 and a high beam 58. In operation, when the light switch 50 is in the off position 50a, no current flows to the headlights 54. When the light switch is in the on position 50b and the light controlling switch 52 is in the off position 52a, current flows from the power source 12 to the high beam 58 headlights 54. When the light switch 50 is in the on position 50b and the light controlling switch 52 is in a hazards position 52b, current flows from the power source 12 to the low beam 56 headlights 54. When the light switch 50 is in the on position 50b and the light controlling switch 52 is in a towing position 52c, current does not flow from the power source to the headlights 54.

The towing and brake circuit 10 also provides the ability to engage the park brake when the engine stalls and the ability to disengage the park brake in order to tow the machine when the engine is not running. The circuit 10 may be used in agricultural and construction machinery, such as, for example, harvesting combines, cotton pickers, tractors and loaders. It is contemplated that the towing and brake circuit 10 may also be used in a wide variety of other types of machinery.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A towing and brake circuit comprising:
a power source, a switch electrically connected between the power source and a park brake solenoid, and a flasher module electrically connected to the park brake solenoid, wherein the switch operates to electrically connect the power source to the flasher module and the park brake solenoid simultaneously.

2. The circuit of claim 1 wherein the power source is a battery.

3. The circuit of claim 1 wherein the switch is a three position switch including an off position, a hazards position and a towing position.

4. The circuit of claim 1 further comprising a park brake switch electrically connected between the switch and the park brake solenoid.

5. The circuit of claim 4 further comprising an engine oil pressure switch electrically connected to the park brake switch.

6. The circuit of claim 4 wherein the park brake switch is a two position switch including an off position and an on position.

7. The circuit of claim 4 wherein the park brake switch includes a left switch and a right switch.

8. The circuit of claim 4 further comprising a diode electrically connected between the park brake switch and the park brake solenoid.

9. The circuit of claim 1 further comprising a unidirectional current controller electrically connected between the flasher module and the park brake solenoid.

10. A towing and brake circuit comprising:
a power source, a switch electrically connected to the power source, a park brake solenoid line electrically connected to a park brake solenoid, a flasher module line electrically connected to a flasher module, and a unidirectional current controller electrically connected between the park brake solenoid line and the flasher module line, wherein the switch may be positioned in a hazards position to electrically connect the power source to the flasher module or a towing position to electrically connect the power source to the park brake solenoid line.

11. The circuit of claim 10 wherein the unidirectional current controller is a diode positioned to flow current from the park brake solenoid line to the flasher module line and to prevent current from flowing from the flasher module line to the park brake solenoid line.

12. The circuit of claim 10 further comprising an engine oil pressure switch electrically connected to the power source, and the park brake solenoid electrically connected to the engine oil pressure switch.

13. A towing and brake circuit comprising:

a power source, a pressure switch electrically connected to the power source, and a park brake solenoid electrically connected to the pressure switch, wherein the park brake solenoid is activated when the pressure switch measures at least a predetermined amount of pressure.

14. The circuit of claim 13 further comprising a flasher module electrically connected between the power source and the park brake solenoid.

15. The circuit of claim 13 wherein the power source is a battery.

16. The circuit of claim 13 wherein the pressure switch is an engine oil pressure switch.

17. The circuit of claim 13 further comprising a park brake switch electrically connected between the pressure switch and the park brake solenoid.

18. The circuit of claim 17 further comprising an emergency brake switch electrically connected between the park brake switch and the park brake solenoid.

19. The circuit of claim 18 wherein the emergency brake switch includes a left brake switch and a right brake switch.

20. The circuit of claim 18 further comprising a diode electrically connected between the emergency brake switch and the park brake solenoid.

21. A method for operating a towing and brake circuit comprising:

providing a power source, a switch electrically connected between the power source and a park brake solenoid, and a flasher module electrically connected to the park brake solenoid;

positioning the switch to electrically connect the power source with the park brake solenoid and the flasher module simultaneously; and directing current from the power source to the park brake solenoid and the flasher module.

22. The method of claim 21 further comprising:

providing an engine without power; and directing current from the power source while the engine is off.

23. The method of claim 21 wherein the power source is a battery; and directing current from the battery.

24. The method of claim 21 wherein the switch is a three position switch which includes a towing position; and positioning the switch to the towing position.

25. The method of claim 21 further comprising:

providing a park brake switch electrically connected between the switch and the park brake solenoid; and turning the park brake switch off to allow current to flow from the power source to the park brake solenoid.

26. The method of claim 25 wherein the park brake switch is a two position switch; and turning the park brake switch to an off position.

27. A method for operating a towing and brake circuit comprising:

providing a power source, a switch electrically connected to the power source, a park brake solenoid line electrically connected to a park brake solenoid, a flasher module line electrically connected to a flasher module, and a unidirectional current controller electrically connected between the park brake solenoid line and the flasher module line;

positioning the switch in a towing position to electrically connect the power source to the park brake solenoid line; and directing current from the power source to the park brake solenoid and to the flasher module.

28. The method of claim 27 wherein the unidirectional current controller is a diode; and positioning the diode to direct current from park brake solenoid line to the flasher module line and to prevent current from flowing from the flasher module line to the park brake solenoid line.

29. A method for operating a towing and brake circuit comprising:

providing a power source, a pressure switch electrically connected to the power source, and a park brake solenoid electrically connected to the switch;

positioning the pressure switch to electrically connect the power source with the park brake solenoid;

flowing current from the power source to the park brake solenoid; and energizing the park brake solenoid to release a park brake when the pressure switch measures at least a predetermined amount of pressure.

30. The method of claim 29 further comprising:

providing a parking brake switch electrically connected between the switch and the park brake solenoid; and turning the park brake switch off to allow current to flow from the power source to the park brake solenoid.

31. The method of claim 30 further comprising:

providing an emergency brake switch electrically connected between the park brake switch and the park brake solenoid; and positioning the emergency park brake switch to allow current to flow from the park brake switch to the park brake solenoid.

* * * * *